United States Patent Office 2,823,129
Patented Feb. 11, 1958

2,823,129

STABILIZER FOR FROZEN SWEET AQUEOUS-BASE COMESTIBLES, AND PRODUCT AND METHOD UTILIZING THE SAME

Willis S. Steinitz, Oceanside, N. Y., assignor to American Food Laboratories, Inc., Brooklyn, N. Y., a corporation of New York No Drawing. Application September 4, 1956
Serial No. 607,584

16 Claims. (Cl. 99—136)

This invention relates to a stabilizer for a frozen, sweet, aqueous-base comestible and to an article and method utilizing the same.

Frozen, sweet, aqueous-base comestibles (the term hereinafter employed to denote edibles such as ice cream, sherbets, soft—i. e. custardy—ice cream, mellorine, and whipped and quiescent ices) conventionally include as ingredients water, a flavoring material and a sweetener. Depending upon the specific type of comestible, they also may include a fat, such for instance as butter fat, serum solids-not-fat, conventionally entitled "SSNF" by the trade, and air.

Over and above the foregoing constituents, all of the aforesaid comestibles essentially include a composition known as a stabilizer. This ingredient, which is found in all commercial ice creams and usually is employed in dry ice cream mixes, is employed for many purposes. For example, one function of the stabilizer is to insure that the ice crystals formed upon freezing are of minute size, whereby to avoid a gritty, coarse texture. Another function of the stabilizer is to prevent growth of already formed ice crystals such as tends to occur when the ice cream is standing in a refrigerated zone. Still another stabilizer function is to promote the formation of the emulsion in comestibles of the character described which include fatty substances, i. e. ice cream. It is believed that the stabilizer performs this last-named function by preventing free movement of the constituents of the comestibles through the emulsion whereby, in a sense, the stabilizer acts as a protective colloid. A further function of the stabilizer is to increase the viscosity of the fat-water emulsion, or the dispersion if an ice is being made, so as to strengthen the walls of the frozen comestible which hold included air bubbles, thereby stiffening the comestible and slowing melt-down. It will be appreciated from the foregoing that the stabilizer is a critical constituent of comestibles of the character under discussion and, even though difficulties are encountered in its incorporation in a liquid mix, these must be solved, for without the stabilizer commercial frozen comestibles would not be feasible.

Actually, in practice, the stabilizer has proved to be the source of more difficulty in handling than any other ingredient of a frozen, sweet, aqueous-base comestible. It is the principal object of the present invention to overcome such drawback.

The conventional commercial stabilizer for comestibles of the character described is a gum or gums. Gums are employed because of certain physical characteristics which uniquely render them able to perform the functions hereinabove set forth as a stabilizer for the subject comestible. The gums employed by the industry are non-toxic, and are not the source of any disagreeable sensations. Said gums are typified by certain physical characteristics which make them useful as stabilizers; thus they are hydrophilic, colloid-forming, water-dispersible, insoluble in organic liquids (a property sometimes referred to as "organic-liquid-phobic"), amorphous and chemically inert.

The gums have another physical characteristic which is the source of the prime difficulty encountered in the use of stabilizers. This is the exhibition of certain unusual properties in the presence of water. For instance, some gums behave much like flour, that is to say, when added to water they "ball," or form lumps in which there is a pasty skin of the wetted gum enclosing a core of dry gum. Also, gums when wetted have a tendency to agglomerate—i. e. to clump and form soft semi-solid masses in water, which clog certain mechanisms—e. g. the strainer located ahead of a foraminous disc homogenizer—or cling to the walls of a container—for instance, to the walls of a mixing vat. Moreover, because of their great affinity for water, there is a tendency for gums to form viscous dispersions, even when present in comparatively small percentages by weight, so that the gums are unusually difficult to add to mixes. If they are added dry, agglomeration or balling will occur, and if it is attempted to predisperse them in water they require considerable amounts thereof, so much as often to render this method of introduction of the gum impractical.

It is an object of the invention to provide an ice cream stabilizer which is not subject to the foregoing drawbacks.

It is another object of my invention to provide an ice cream in which the gum is so conditioned that it can be quickly and uniformly dispersed throughout an aqueous-base mix.

It is another object of my invention to provide a stabilizer of the character described in which the gum is predispersed in a non-aqueous liquid matrix whereby to condition it for further dispersal throughout an aqueous carrier.

It is another object of my invention to provide a stabilizer of the character described which has a fixed dispersion of solid in liquid whereby to insure a long shelf life and the ability to employ it under all kinds of conditions—i. e. on humid days, on dry days, and in either a cold or a hot liquid mix.

It is another object of my invention to provide a stabilizer of the character described which can be manufactured simply and easily and which does not noticeably increase the cost of the ultimate product.

It is another object of my invention to provide a stabilizer of the character described which does not appreciably increase the bulk of the ice cream and which is itself relatively compact.

It is another object of my invention to provide a frozen, sweet, aqueous-base comestible and method of making the same with the use of my novel stabilizer.

In general, my invention is carried out by providing a composition which essentially includes a gum dispersed or suspended in an organic liquid, and may further comprise a suspension agent and/or an emulsifier. The ingredients preferably are so proportioned that the composition is fluid, e. g. a thin slurry—although it is within the scope of my invention, as will be apparent hereinafter, to so increase the proportion of solids that the composition becomes semipasty or even pasty.

The term "gum" as used herein connotes all of the substances having the physical characteristics above mentioned, to wit: the desirable characteristics of being hydrophilic, colloid-forming, water-dispersible, organic-solvent-phobic and amorphous, as well as the undesirable characteristic of balling and/or agglomerating and/or forming thick, sticky masses even in the presence of very large quantities of water. Typical gums are tree and shrub exudations, such for instance as tragacanth, arabic, ghatti, and karaya; seaweed colloids such as agar, carrageen and sodium alginate; seed extracts such as locust bean, quince and guar; starches and starch derivatives—e. g. converted starches; water-dispersible cellulose derivatives—e. g. sodium carboxymethylcellulose; and pectins; such as apple pectin and citrus pectin. It will be appreciated from the foregoing that the gums either are natural or synthetic substances. It further will be understood by chemists skilled in this art that in general the gums are of indefinite composition.

Any one or more of the foregoing gums can be used, in accordance with my invention, as an ingredient of a stabilizer, the gum, indeed, constituting the principal substance. That is to say, from a physical point of view all of the gums are suitable. However, economics, taste, palatability, texture, viscosity, government regulations, availability, seasonal considerations, geography, and other incidental factors may be determinative of the actual gum employed in any given situation and on any specific occasion. Many of these gums are presently used as the prime, and often the only, ingredient of present-day commercial stabilizers and when they are, as has been mentioned hereinabove, they cause considerable trouble. When used alone, they invariably cake on the outer wall of the mixing vat or clog the strainer between the mixing vat and the homogenizer. Moreover, due to their incomplete dispersion, they commonly require the use of considerably more of the gum than actually is necessary. Even when used with bulking agents, such, for instance, as sugar, they still retain many of the undesirable features, and particularly that of clumping.

Various methods have been proposed to avoid the undesirable side effects of stabilizers—for instance, some manufacturers mix a stabilizer which in many cases already contains sugar or corn sugar with an additional inordinately large quantity of sugar to aid dispersion in the liquid mix. Others try to sprinkle the stabilizer dry into a mixing vat at the point of greatest agitation. Still other manufacturers, where the stabilizer is an alginate, stir the same rapidly into a large can of water immediately before addition to the liquid mix, hoping thus to take advantage of the slight delay in colloid formation peculiar to alginates. However, in none of these cases have truly satisfactory results been achieved, and the latter method, it may be noted, cannot be used for most gums because of the great speed with which these gums form an excessively viscous water dispersion. Ordinarily, any intimate and thorough dispersion of a gum and water will create a heavy, sticky mass which is completely unsuitable for admixture with a liquid mix.

The gums which I presently prefer to employ in carrying out my invention are, specifically, locust bean, karaya, carrageen, pectin, sodium alginate and sodium carboxymethylcellulose.

The liquid carrier employed in pursuance of my invention can be any organic liquid, that is to say, insofar as the physical factors are concerned, any organic liquid is acceptable which does not react chemically with the stabilizer, or any of the ingredients of the liquid mix, or the materials of any of the containers or mechanisms which come in contact with the liquid mix during or after introduction of the stabilizer. Thus, one of the requirements of the liquid is that it be chemically inert under the particular conditions prevailing in this field. The organic liquid also must be non-toxic and palatable in the amount utilized. Types of organic liquids having the foregoing characteristics and therefore usable in connection with my invention are: alcohols, such for instance, as the aliphatic and polyhydric alcohols, esters, such for instance as esters of polyhydric alcohols and fatty acids, ethers, aldehydes, ketones, acids, triglycerides, essential oils, quinones, and alicyclic compounds including the cyclic terpenes. By way of example, I have secured particularly satisfactory results with ethyl alcohol, glycerine, propylene glycol, glyceryl oleate, propylene glycol oleate, sorbitan stearate, butter oil, vegetable oil and mineral oil. It is emphasized that, insofar as the organic liquid is concerned, the criteria are physical, i. e. that it shall be water-free, non-toxic, palatable and inert, in this system. No chemical reactions or characteristics of any nature whatsoever are required.

The physical make-up of the stabilizer as thus constituted—e. g. essentially comprising a gum and an organic liquid—is not critical. For example, said stabilizer may be quite fluent, consisting for instance of as little as 10% by weight of the gum and 90% of the liquid carrier. Nevertheless, it is more practical and economical to use higher percentages of the gum, since it is the gum which performs the active functions of the stabilizer, and the carrier merely serves to disperse the gum throughout the liquid mix. Hence, I have used a slurry composed of as high as 40% by weight of the gum and 60% of the organic liquid with perfectly satisfactory results. Indeed, it is within the scope of my invention to use a stabilizer which is semi-pasty or even pasty, in which case still larger amounts of solids can be used—e. g. as high as 80% by weight of solid and 20% by weight of the organic liquid.

To make the stabilizer it simply is necessary thoroughly to disperse the gum through the organic liquid. Preferably, dispersion is aided by homogenization, this typically being effected by a fine milling step such as ball milling or pin milling or colloid milling. The milling is performed after the gums have been mixed with the organic liquid. As a result a composition is made which varies in flowability from an extremely thin slurry all the way up to a paste.

A stabilizer embodying my invention can be added to a sweet, aqueous base, freezable liquid mix at any stage without giving rise to the undesirable side effects hereinabove discussed at length. For example, the stabilizer can be added in the mixing vat, to either hot or cold mix, or during passage of the mix from the mixing vat to the homogenizer. It can even be added in the homogenizer or after the homogenization.

If desired, the stabilizer can be added as late in the process of making the frozen comestible as the pre-freezing step—i. e. the chilling step preceding churning and freezing. This is far later than it has ever been possible heretofore to add a stabilizer successfully.

I have observed that my new stabilizer readily disperses throughout the mix and thereby distributes the gum evenly and uniformly through the mix, rendering all particles of the gum accessible to the same degree to the water base of the mix. Moreover, I have noted that the gum, when thus treated, adds all the requisite characteristics to the mix without imparting any of the undesirable characteristics. Thus there is no clumping, undesirable thickening, or balling. Indeed, as a result of the absence of these characteristics, even less of the gum can be used than now is conventionally employed, this being because full utilization is obtained of each particle of the gum.

The stabilizer is added in any convenient manner. For example, if it is incorporated in the mixing vat it simply is poured into the vat, preferably at a zone of agitation. Alternatively it can be forced into the conduit leading from the mixing vat to the homogenizer, and it will be found that, during the homogenizing step, the stabilizer will disperse smoothly and with great ease. It can be added in like fashion to the liquid mix at any stage of the process.

Inasmuch as many ice cream manufacturing plants have converted to the use of liquid sugars, i. e. syrups, and no dry sugar is available for mixing with a stabilizer prior to adding the same to an ice cream mix, it is a particular advantage of my invention that my new stabilizer does not have to include any sugar for bulking or other purposes. Another advantage of my stabilizer arising in connection with the addition thereof to a liquid mix concerns that manufacturing process known as "high temperatures short time pasteurization." In this process the liquid mix is heated to an elevated temperature for a comparatively short time, e. g. 15 to 20 seconds. Under such a short interval conventional stabilizers are unable fully to swell and disperse throughout liquid mix, and accordingly, manufacturers following such process have had considerable difficulty with stabilizers. However, when using my new stabilizer such difficulty is avoided. I found that my stabilizer when added to a liquid mix prior to a high temperature short time pasteurization is so completely and thoroughly dispersed throughout the mix that during the short pasteurization period the gum is completely converted into the proper physical condition for correct stabilization of the mix.

A typical satisfactory example of a stabilizer consisting of only the foregoing principal ingredients is:

*Example 1*

| | Oz. |
|---|---|
| Sodium carboxymethylcellulose | 33.3 |
| Propylene glycol | 66.7 |

The amount of stabilizer added to the mix is determined by the proportion of gum present in the stabilizer and the proportion of gum that is desired to be present in the ultimate mix. For example, if sodium carboxymethylcellulose is employed as the gum in an ice cream mix having a butterfat content ranging from about 10% to 12%, it is desirable to employ said gum in a concentration of about 0.15% by weight of the mix. It will be apparent that, since the gum is only a fraction of the stabilizer, more stabilizer than gum must be used. Thus, if the gum is one-third of the stabilizer by weight, three times as much of the stabilizer must be used, and in the foregoing example the amount of total stabilizer to be added would be 0.45% by weight of the mix.

Because different gums conventionally are present in different proportions by weight in a mix—e. g. carrageen is about five times more effective than sodium carboxymethylcellulose—since different manufacturers find it feasible to use different percentages of the gums, and since the gums also will vary with the particular constituents, flavor and texture required, it will be appreciated that the amount of stabilizer employed or the amount of gum employed in accordance with my invention will vary widely and cannot be fixed within any specific range.

It often is advantageous to employ more than a single organic liquid to aid in expediting dispersion of the stabilizer and the gum throughout a fluid comestible mix. An example of a stabilizer so constituted is:

*Example 2*

| | Oz. |
|---|---|
| Sodium carboxymethylcellulose | 33.3 |
| Propylene glycol | 51.7 |
| Glycerine | 15 |

It also is sometimes desirable to have present more than a single gum in order to secure a certain selected texture. Examples of stabilizers utilizing two gums are:

*Example 3*

| | Oz. |
|---|---|
| Sodium carboxymethylcellulose | 24 |
| Carrageen | 6 |
| Propylene glycol | 20 |
| Glycerine | 40 |

*Example 4*

| | |
|---|---|
| Sodium carboxymethylcellulose | 25 |
| Gum arabic | 12 |
| Glycerine | 43 |
| Propylene glycol | 20 |

The predispersal of the gum in the organic solvent forms in effect a suspension, which can be caused to maintain stability for substantial periods of time by initial thorough agitation, such as the colloid milling above referred to. Nevertheless, there is a strong tendency for the particulate gum to settle and this affects the commercial utility of the stabilizer under certain conditions—for instance, where the stabilizer must have a long shelf life. I have found that such tendency can be counteracted by incorporating a suspending agent. Edible esters of fatty acids are excellent for this purpose, a typical such compound being glyceryl monostearate. It is desirable that the suspending agent be miscible, dispersible or soluble in the organic liquid. Moreover, it is preferable even where such an agent is employed, that homogenization, milling or an equivalent step be retained for securing excellent dispersion of the gum throughout the organic liquid, inasmuch as this dispersion is to a large extent responsible for the excellent ultimate dispersion of the stabilizer throughout a mix and for the low over-all time required to enable the water properly to condition the gum. It also is believed that it is this dispersion which enables the stabilizer to be added to the liquid mix, if desired, so late in the process of making the frozen comestible.

Many compounds will function satisfactorily as suspension agents. The suspension agent, like the previously described ingredients of the stabilizer—i. e. the gum and the organic liquid—should be selected for its physical, rather than its chemical, properties. Thus said suspension agent, in addition to having the necessary physical characteristics to function as a suspension means, must be non-toxic and palatable in the quantities employed and must be chemically inert to the other ingredients of the stabilizer, the liquid mix to which the stabilizer is to be added, and the physical elements with which the mix is to come into contact.

Typical suspending agents are emulsifying agents and finely divided solids, said agents being, of course, like all of the other ingredients of the stabilizer, non-toxic, palatable, and chemically inert. Some suitable finely divided soldis are casein, activated carbon, bentonite, silica, alumina, and salts in general. Some suitable emulsifying agents are sodium stearate, potassium laurate, sodium lauryl sulfate, sodium sulfosuccinate, magnesium oleate, aluminum stearate, polyoxyethylene fatty alcohol ethers, polyglycol fatty acid esters, polyoxyethylene modified fatty acid esters, polyoxyethylene-polyol fatty acid esters, polyoxypropylene fatty alcohol esters, polyoxypropylene glycol fatty acid esters, polyoxypropylene modified fatty acid esters, polyoxypropylene-polyol fatty acid esters, polyol fatty acid monoesters, lecithin, polyhydric alcohol fatty acid di-, tri-, etc. esters, cholesterol and fatty acid esters, lanolin, and oxidized fatty oils.

Examples of stabilizers including a suspension agent are the following:

*Example 5*

| | Oz. |
|---|---|
| Sodium carboxymethylcellulose | 19 |
| Carrageen | 5 |
| Glycerine | 62 |
| Ethyl alcohol | 6 |
| Propylene glycol | 3 |
| Glyceryl monostearate | 5 |

*Example 6*

| | |
|---|---|
| Sodium carboxymethylcellulose | 30 |
| Propylene glycol | 60 |
| Glyceryl monostearate | 10 |

*Example 7*

| | |
|---|---|
| Sodium carboxymethylcellulose | 30 |
| Propylene glycol | 45 |
| Glycerine | 10 |
| Glyceryl monostearate | 15 |

*Example 8*

| | |
|---|---|
| Sodium carboxymeihyicellulose | 24 |
| Carrageen | 6 |
| Propylene glycol | 20 |
| Glycerine | 40 |
| Glyceryl monostearate | 10 |

Example 9

| | Oz. |
|---|---|
| Sodium carboxymethylcellulose | 25 |
| Gum arabic | 12 |
| Glycerine | 43 |
| Propylene glycol | 20 |
| Glyceryl monostearate | 15 |

Exemplicatively, the preparation of this fifth composition is effected by thoroughly mixing the sodium carboxymethylcellulose, carrageen and glycerine at room temperature to form a first slurry and then pin milling the same. The glyceryl monostearate is dissolved in the ethyl alcohol at slightly elevated temperature, to effect solution and the propylene glycol added thereto. Thereafter, the liquid composition is added to the slurry and thoroughly agitated. It can be, if desired, further processed by pin milling at room temperature, although the suspended slurry prepared as above will be stable without milling for extended periods of time.

Frozen, sweet, aqueous-base comestibles have of late also included an additional ingredient which is particularly convenient to add to the mix by means of my new stabilizer. I refer to that class of ingredients known to the trade as "emulsifiers." These compounds promote the formation of emulsions, either of the oil-in-water or the water-in-oil type, as the case may be. A typical ingredient which is held in suspension in ice cream is butter fat, which is present in an oil in water-type emulson. The emulsifiers used in comestibles of the character described usually are esters of the higher alcohols, such as glycerol or sorbitol, with long chain fatty acid such as stearate, oleic or palmitic. Particularly effective are the polyoxyethylene derivatives of said esters, which are commercially known as the "Tweens," and are made by the Atlas Powder Company of Wilmington, Delaware. As is well known, said compositions are in part hydrophilic and in part lipophilic, and thus are particularly advantageous for ice cream, since they aid in the formation and maintenance of small fat globules, preventing these from clumping and making certain of a fine and thorough dispersion of the fat within the water matrix.

Typical emulsifiers are those mentioned above under the classification of emulsifying agents. It thus will be apparent that an emulsifying agent can serve two functions, to wit: as a suspension agent for the stabilizer, and as an emulsifier for the liquid mix. It is to be observed, however, that if the emulsifying agent is to serve as an emulsifier for the liquid mix it should be present in the stabilizer in a greater proportion than if used only for a suspending agent. Examples of stabilizers embodying my invention and including emulsifying agents in sufficient proportion for use as emulsifiers in a liquid mix are:

Example 10

| | Oz. |
|---|---|
| Sodium carboxymethylcellulose | 24 |
| Carrageen | 6 |
| Propylene glycol | 20 |
| Tween 80 (Polyoxyethylene sorbitan monoleate, manufactured by Atlas Powder Co.) | 10 |
| Glycerine | 30 |
| Glyceryl monostearate | 10 |

Example 11

| | Oz. |
|---|---|
| Locust bean gum | 24 |
| Carrageen | 6 |
| Glyceryl monooleate | 40 |
| Glyceryl monostearate | 10 |
| Glycerine | 20 |

Further examples of stabilizers embodying my invention are:

Example 12

| | Oz. |
|---|---|
| Locust bean gum | 12 |
| Irish moss | 12 |
| Glycerine | 62 |
| Ethyl alcohol | 6 |
| Propylene glycol | 4 |
| Glyceryl monostearate | 4 |

Example 13

| | |
|---|---|
| Guar | 12 |
| Irish moss | 12 |
| Glycerine | 56.5 |
| Ethyl alcohol | 6.0 |
| Propylene glycol | 9.0 |
| Glyceryl monostearate | 4.5 |

Example 14

| | |
|---|---|
| Locust bean gum | 22.5 |
| Pectin, 150 grade | 9.5 |
| Glycerine | 55.5 |
| Ethyl alcohol | 5.0 |
| Propylene glycol | 3.5 |
| Glyceryl monostearate | 4.0 |

The foregoing stabilizer is particularly useful for sherbets and ices.

It thus will be seen that I have provided stabilizers and a method and article utilizing the same which achieve the various objects of my invention and are well adapted to meet the conditions of practical use.

As various possible embodiments may be made of my above invention, and as various changes might be made in the embodiments above set forth, it is to be understood that all matter herein described is to be interpreted as illustrative and not in a limiting sense.

Having thus described my invention, I claim as new and desire to secure by Letters Patent:

1. A stabilizer for frozen, sweet, aqueous-base comestibles, said stabilizer essentially comprising a gum suspended in a water-free organic liquid.

2. A stabilizer for frozen, sweet, aqueous-base comestibles, said stabilizer essentially comprising a gum suspended in a water-free organic liquid and further including a suspending agent.

3. A stabilizer for frozen, sweet, aqueous-base comestibles, said stabilizer essentially comprising a gum suspended in a water-free organic liquid and further including an emulsifier.

4. A stabilizer for frozen, sweet, aqueous-base comestibles, said stabilizer essentially comprising a gum suspended in a water-free organic liquid and further including a suspending agent and an emulsifier.

5. A stabilizer for frozen, sweet, aqueous-base comestibles, said stabilizer including non-toxic, palatable, chemically inert ingredients and essentially comprising a gum suspension in a water-free organic liquid carrier.

6. A stabilizer as set forth in claim 5 which further includes glyceryl monostearate.

7. A stabilizer for frozen, sweet, aqueous-base comestibles, said stabilizer essentially comprising sodium carboxymethylcellulose suspended in a non-toxic, palatable, and chemicaly inert water-free organic liquid.

8. A stabilizer for frozen, sweet, aqueous-base comestibles, said stabilizer essentially comprising carrageen suspended in a non-toxic, palatable, and chemically inert water-free organic liquid.

9. A stabilizer for frozen, sweet, aqueous-base comestibles, said stabilizer essentially comprising locust bean gum suspended in a non-toxic, palatable, and chemically inert water-free organic liquid.

10. A stabilizer for frozen, sweet, aqueous-base comestibles, said stabilizer essentially comprising gum guar suspended in a non-toxic, palatable, and chemically inert water-free organic liquid.

11. A stabilizer for frozen, sweet, aqueous-base comestibles, said stabilizer essentially comprising pectin suspended in a non-toxic, palatable, and chemicallly inert water-free organic liquid.

12. A stabilizer for frozen, sweet, aqueous-base comestibles, said stabilizer essentially comprising a gum suspended in fine particulate form in a water-free liquid essentially comprising ethyl alcohol.

13. A stabilizer for frozen, sweet, aqueous-base comestibles, said stabilizer essentially comprising a gum suspended in fine particulate form in a water-free liquid essentially comprising glycerine.

14. A stabilizer for frozen, sweet, aqueous-base comestibles, said stabilizer essentially comprising a gum suspended in fine particulate form in a water-free liquid essentially comprising propylene glycol.

15. A frozen, sweet, aqueous-base comestible, including a stabilizer such as set forth in claim 1.

16. In a method of manufacturing a frozen, sweet, aqueous-base comestible, that improvement including the step of incorporating a stabilizer as set forth in claim 1.

References Cited in the file of this patent
UNITED STATES PATENTS

| | | |
|---|---|---|
| 1,216,383 | West | Feb. 20, 1917 |
| 2,007,218 | Seltzer et al. | July 9, 1935 |
| 2,097,225 | Green et al. | Oct. 26, 1937 |
| 2,097,229 | Lucas et al. | Oct. 26, 1937 |
| 2,395,061 | Musher | Feb. 19, 1946 |
| 2,423,600 | Landers | July 8, 1947 |
| 2,493,324 | Steiner et al. | Jan. 3, 1950 |
| 2,556,282 | Le Gloahec | June 12, 1951 |
| 2,587,369 | Nash | Feb. 26, 1952 |